June 4, 1940.    J. L. ANDERSON    2,203,319
TUBE WELDING APPARATUS
Filed July 13, 1937    2 Sheets-Sheet 1

INVENTOR
James L. Anderson
BY J. F. Brandenburg
ATTORNEY

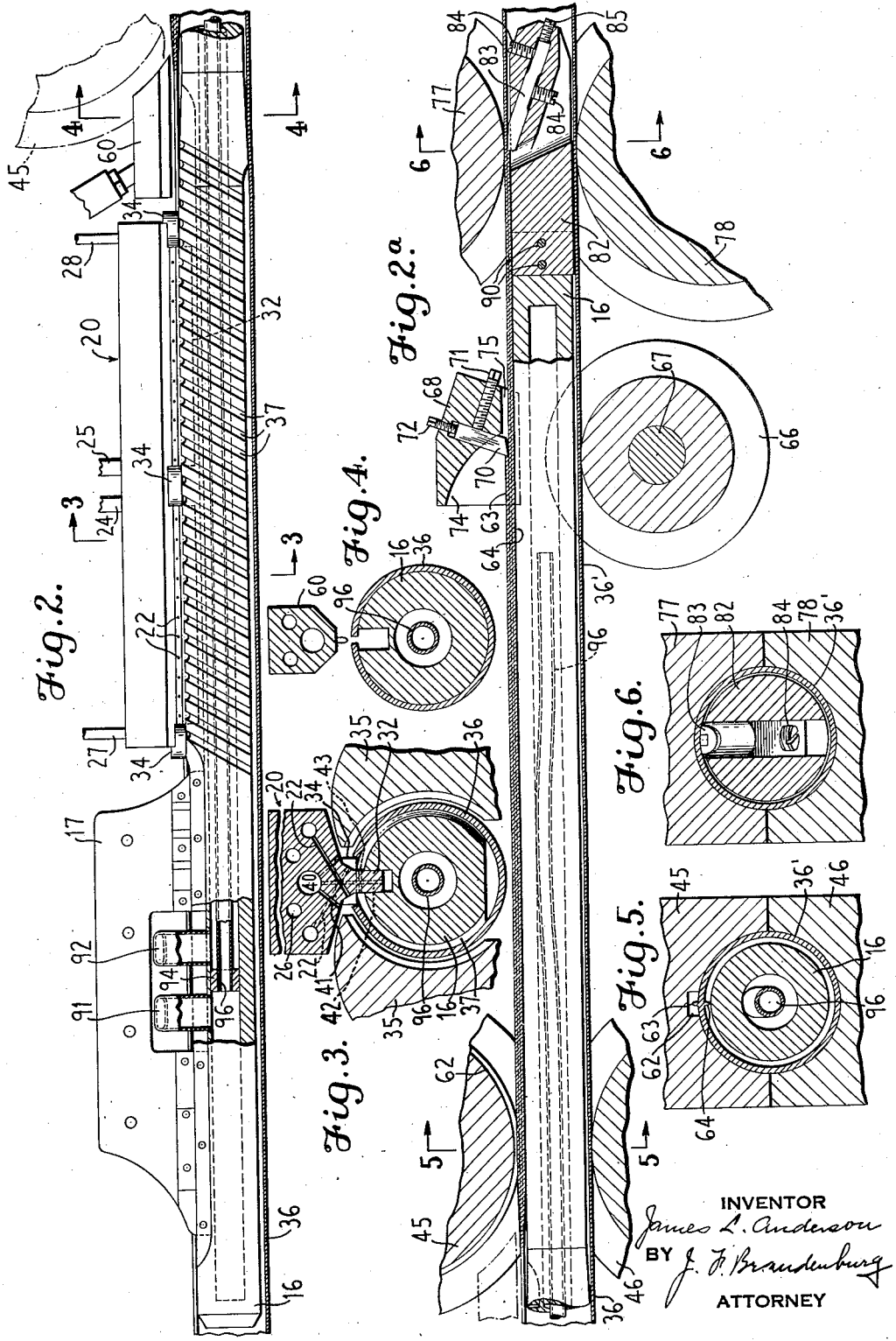

Patented June 4, 1940

2,203,319

UNITED STATES PATENT OFFICE 2,203,319

TUBE WELDING APPARATUS

James L. Anderson, Closter, N. J., assignor to Air Reduction Company, Incorporated, New York, N. Y., a corporation of New York Application July 13, 1937, Serial No. 153,335

4 Claims. (Cl. 29—33)

This invention relates to tube welding.

It is an object of the invention to provide an improved apparatus for making high grade tubing having a welded seam of substantially the same strength as the body of the tube. This result is especially desirable in welded tubes which are to be used as power transmitting shafts, such as drive shafts for autotmobiles. Metal of a weld which is melted and then allowed to harden in making the weld forms a region of cast metal which has a different grain structure and is not as strong as the rolled stock used for tubing of drive shaft grade.

In order to produce a strong and reliable weld it is necessary to have at least a superficial melting of the edge faces which come together to make the weld, but when the fused stock hardens, the grain structure is that of cast metal. This invention eliminates the melted metal from the weld by displacing the edge portions toward one another after the edge faces come into contact and so proportioning the displacement to the heating and fusing that substantially all of the molten metal is squeezed out of the seam between the edge portions. It is actually the metal immediately behind the molten layers on the edge faces that welds together to make the seam, and the fused metal is thrown out as a flash or bead either outside or inside of the tube, or both outside and inside depending upon the apparatus used to make the weld.

One or more cutting tools remove the flash and leave the tube with a weld containing little or no cast metal, and a weld which has the same thickness as the body of the tube, a feature which gives dynamic balance to the tube. The welding and the removal of the flash is performed as a continuous operation.

While the direct edge heating of the skelp or the partially-formed tube is performed preferably by means of high-temperature gas flames and will be so shown, it will be understood that other heating agencies of sufficient intensity may be employed.

Other objects, features and advantages of the invention will appear or be pointed out as the specification proceeds.

In the accompanying drawings, forming part hereof:

Fig. 2 is an enlarged view, partly in section, showing the forward end of the mandrel of the apparatus illustrated in Fig. 1, and showing a tube blank in its relation to the other parts;

Figure 1:
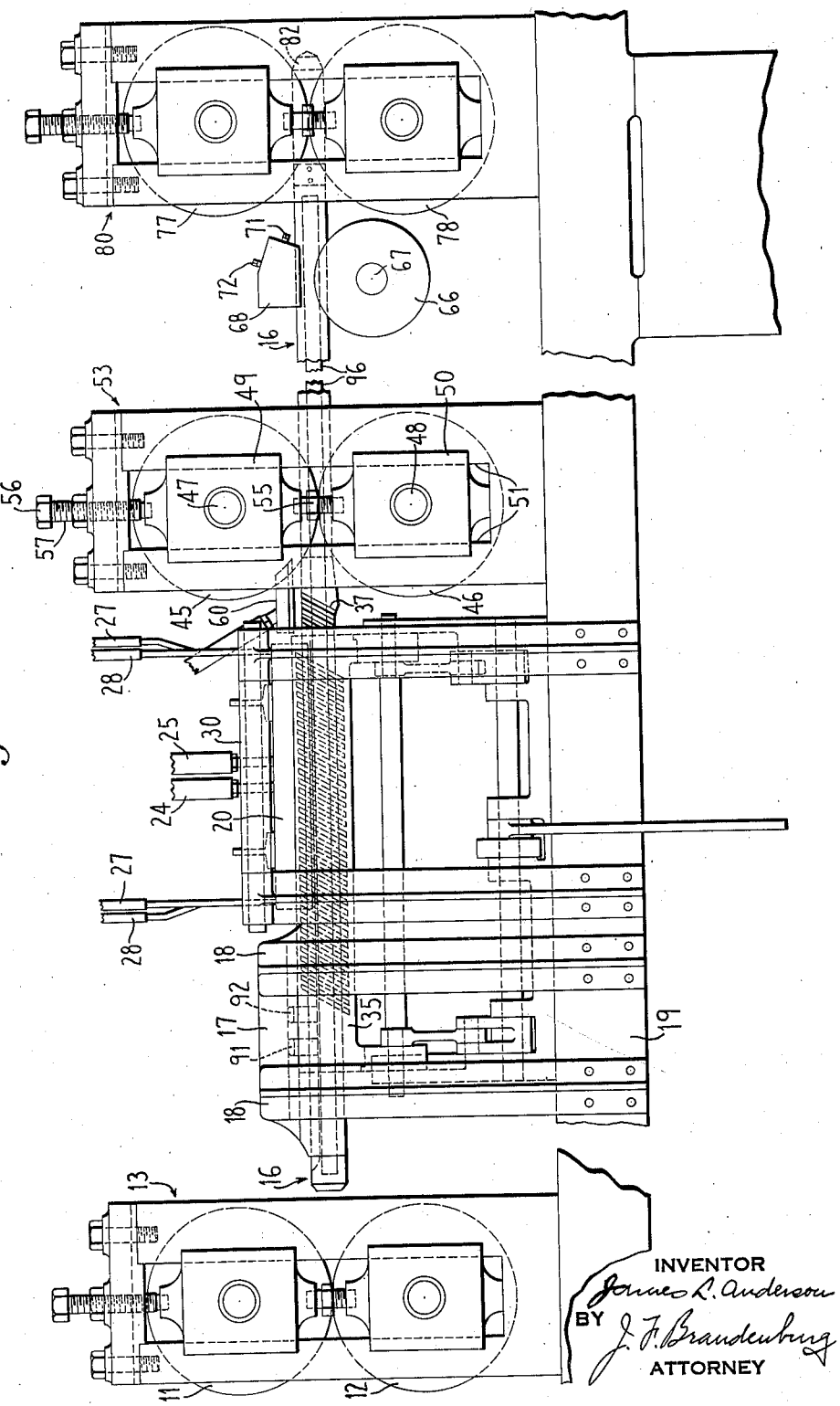
Fig. 1 is a side elevation of apparatus for making welded tubes in accordance with this invention.

Fig. 2ᵃ is a sectional view showing the rearward portion of the mandrel and tube of Fig. 2, and also showing the welding rolls and cutting tools; and Figs. 3-6 are enlarged transverse sectional views taken at the lines 3—3, 4—4, 5—5, and 6—6, respectively, of Figs. 2 and 2ᵃ.

The apparatus shown in Fig. 1 includes feed rolls 11, 12 supported in the frame of a roll stand 13 and driven by power mechanism, not illustrated but well understood in the art. Partially formed or open-seam stock is supplied to the feed rolls 11, 12. This stock or tube blank may be either cold or preheated, and may come direct from a forming mill.

A mandrel 16 is connected to a fin 17 fastened to frame members 18 that are secured at their lower ends to the main frame 19 of the machine. The fin 17 not only serves as an anchorage for the mandrel but functions also as a seam guide for the tube blank.

Beyond the guide fin 17 there is a heating instrumentality, shown in the drawings as a torch 20, located along the run of the tube blank in position to heat the horizontal edge faces of the tube blank by projecting heating agencies, such as oxy-fuel flame jets, directly against the edge faces of the traveling tube blank in the manner shown in Fig. 3. The flame jets issue from orifices indicated by the reference character 22 in Figs. 2 and 3. Other heating agencies can be used.

Oxygen and fuel gas are supplied to the torch 20 through a stock 24, and air is supplied to the torch through a stock 25. The torch is cooled by fluid passing through cooling chambers 26 in the torch block and flowing to and from the torch through tubes 27, 28. The torch 20 is supported from a frame 30 connected with the main frame 19 of the machine. A flange 32 along the bottom of the torch fits into a groove in the top of the mandrel 16.

Guide blocks 34 at the ends and mid-portion of the torch 20 keep the seam edges from coming together as they pass under the torch. Grooved guide blocks 35 surround most of the circumference of the tube blank and guide products of combustion from the flame jets diagonally across the outside surface of the tube blank. In the drawings the tube blank is indicated by the reference character 36 and the welded tube by the reference character 36'.

That portion of the mandrel 16 which is located under the torch 20 has grooves 37 through which the products of combustion that enter the tube blank flow diagonally forward around the inside surface of the tube blank and assist in heating the blank. The bottom of the mandrel 16 from the torch to the forward end of the mandrel is flat to leave a clearance between the mandrel and the tube blank for the escape of gases flowing down through the grooves 37.

The fuel gas used is preferably acetylene, and the products of the primary combustion of an oxyacetylene mixture are combustible. The torch 20 makes special provision for supplying air for the secondary combustion, the burning of the envelope gases produced by the flame jets. Air is supplied through the stock 25 to a chamber 40 in the torch block. Diverging jet passages 41 supply air above the flames for the combustion of that portion of the envelope gas which flows around the outside of the tube blank.

Passages 42 drilled upward through the flange 32 into the chamber 40 have cross-drillings 43 through which jets of air are supplied under the flames 22 for the combustion of the envelope gases which enter inside the tube blank.

A short distance behind the torch 20 the tube blank enters the pass between welding rolls 45 and 46. The rolls turn on horizontal axles 47, 48 (Fig. 1) held in bearing blocks 49 and 50. The bearing blocks are vertically adjustable along guides 51 of a roll stand 53. Spacing of the bearing blocks 49 and 50, and of the axles 47, 48, is controlled by an adjusting screw 55 located between the bearing blocks. A pressure screw 56 threads through the top of the frame of the roll stand 53 and bears against the top of the upper bearing block 49. A lock-nut 57 holds the screw 56 in any set position. There are bearing blocks at both ends of the axles 47 and 48.

An auxiliary torch 60 is located between the end of the torch 20 and the point where the seam edges come into contact as they enter the welding roll pass. The auxiliary torch 60 does not extend into the seam and it has jet orifices which direct flames downward into the progressively closing seam, as shown in Fig. 4, to maintain the edge faces of the tube blank in a welding condition after they pass beyond the torch 20.

The upper welding roll 45 straddles the seam, as shown in Fig. 5, and there is a groove 62 in the face of the roll over the seam. The welding rolls are of such size in proportion to the diameter of the tube and are so adjusted that they subject the seam to a pressure sufficient to squeeze the molten metal out from between the edges in the form of a bead or flash 63 on the outside of the tube and a similar bead or flash 64 on the inside. The apparatus can be constructed so as to obtain all of the flash on one side of the tube. For example, elimination of the groove 62 in the upper roll 45 would cause all of the flash to project inward, or a large mandrel completely filling the tube would cause the flash to be projected outward. A more reliable squeezing out of substantially all of the metal which has been melted is obtained, however, when both an external and internal flash are produced.

The circumference of the substantially circular pass between the welding rolls is less than the width of the skelp from which the tube blank is made, and the action of the welding rolls is to cause the portions of the tube on either side of the seam to move circularly across the surfaces of the rolls toward the seam, so that the edge portions of the tube are displaced toward one another.

Beyond the welding roll stand the tube passes across a supporting roll 66 which turns on an axle 67 and has a concave face that fits the curvature of the tube. A shoe 68 holds the tube 36' down against the supporting roll 66. A cutting tool 70 fits into a socket in the shoe 68 and is clamped against movement by a set-screw 71 threaded through the shoe 68. Vertical positioning of the cutting tool 70 is effected by means of a screw 72 threading through a wall of the shoe 68 at the upper end of the tool socket. The cutting tool 70 is located immediately above the supporting roll 66. The distance between the welding roll stand and the cutting tool 70 is sufficient to permit the metal at the weld to cool to a temperature suitable for cutting.

The tool 70 is ground to the shape of the tube 36' so that the flash 63 is removed without leaving any flat spot or break in the cylindrical surface of the tube. A recess 74 in front of the cutting tool 70 provides ample clearance for chips thrown up by the cutting action of the tool. There is a groove 75 in the shoe behind the tool 70 for the escape of chips on the surface of the tube and traveling with the tube.

Beyond the supporting roll 66 and the tool 70, the tube travels between two rolls 77 and 78 on horizontal axles supported at their opposite ends by bearing blocks in a roll stand 80 similar in construction to the axles and bearings of the welding roll stand 53. Within the tube where it passes between the rolls 77 and 78 is a tool-holder 82 connected with the end of the mandrel 16. A tool 83 is held in a socket in the tool-holder by set-screws 84, and the position of the tool with respect to the tube wall can be accurately adjusted by means of an adjusting screw 85 threaded through a wall of the tool-holder 82 at the end of the tool-receiving recess. The lower part of the tool-holder is cut away for the escape of chips. The roll 77 is directly over the tool 83 to prevent displacement of the tube wall by the pressure of the cutting tool.

The mandrel 16 is hollow and closed at both end by heads welded to the main portion at its forward and rearward ends. The tool-holder 82 is connected to the mandrel 16 by a tongue which fits into a groove in the head at the rearward end of the mandrel and is fastened to the head by rivets 90 (Fig. 2ª).

The mandrel 16 is water-cooled. There are inlet and outlet connections 91 and 92 (Fig. 2) respectively extending through the wall of the mandrel at points near the middle of the guide fin 17, as shown in Fig. 2. There is a partition 94 across the inside of the mandrel between the cooling water connections 91 and 92. A pipe 96 having an outside diameter substantially less than the inside diameter of the mandrel extends through the partition 94 and along the inside of the mandrel to a point well beyond the welding rolls and preferably almost to the flash-removing tools. The pipe 96 is bent to bear against the inside wall of the mandrel with enough pressure to prevent the pipe from vibrating and striking the wall of the mandrel.

Water or other cooling fluid flows into the mandrel through the inlet connection 91, then toward the rearward end of the mandrel through the pipe 96, and then back through the space between the pipe 96 and the wall of the mandrel to the outlet connection 92.

Terms of orientation used in the description and claims are, of course, relative, and it will be apparent that the invention is not limited to the embodiments which have been described and that features of the invention may be used without others.

I claim:

1. In tube welding apparatus through which a tube blank moves with continuous motion, a heating agency in position to heat the edge faces of the tube blank locally to bring said faces to a molten condition, and welding rolls immediately behind the heating agency including an upper roll which contacts with the tube blank for substantially equal distances on both sides of the seam, said upper roll having a groove immediately over the seam, and a lower roll cooperating with the upper roll to cause the fused edge faces of the tube blank to be pressed together with great force so that molten metal on the edge surfaces is squeezed out from between the edge portions of the tube blank to produce a flash extending into the groove in the upper roll.

2. Tube welding apparatus including feed rolls for advancing a tube blank through the apparatus with continuous motion, guide means for maintaining spaced edges of the tube blank in a definite position at the top of the blank, a heating instrumentality above the tube blank in position to heat the edge faces locally to a molten condition, welding rolls immediately beyond the heating instrumentality including an upper roll rotatable on a horizontal axis and contacting with the tube on both sides of the seam, said upper roll having a groove in its face immediately above the seam, and a lower roll cooperating with the upper roll to cause the molten edge surfaces to be pressed together with great pressure which forces the melted metal from between the edge portions of the tube blank and forms a flash extending into the groove in the face of the upper roll.

3. A tube welding machine comprising means for advancing a tube blank lengthwise with the longitudinal edges of the blank spaced apart and at the top of said blank, means for heating and fusing the faces of said edges, and welding rolls immediately behind the heating and fusing means for bringing the fused faces together to make a weld including upper and lower rolls rotating on horizontal axes and forming a substantially circular pass having a circumference slightly less than the width of the metal of the tube blank so that the edges are pressed together and the molten metal displaced as the tube blank travels through the welding roll pass, the upper roll having a groove over the seam providing a space into which molten metal can be displaced.

4. In tube welding apparatus having means for feeding a tube blank lengthwise with its edges spaced apart, and heating means for fusing the faces of said edges, welding rolls in position to bring the edge faces together while in a fused condition, said rolls forming a pass of a size that compresses the tube blank and squeezes the molten metal from the seam to make a flash along both the outside and inside of the tube, a supporting roll beyond the welding roll under the tube pass, a cutting tool above the supporting roll in position to smooth the outside of the weld, another cutting tool inside the pipe beyond the outside cutting tool and in position to remove the inside flash, and a roll in contact with the smoothed outside of the tube in position to hold the tube against displacement by the inside cutting tool.

JAMES L. ANDERSON.